Jan. 14, 1969  T. J. WIETING ET AL  3,421,374
THERMAL DETECTOR
Filed Oct. 22, 1965

INVENTORS
TERENCE J. WIETING
THOMAS R. LAWRENCE
CHARLES S. NAIMAN
BY
David A. Rich
ATTORNEY

United States Patent Office 3,421,374
Patented Jan. 14, 1969

3,421,374
THERMAL DETECTOR
Terence J. Wieting, Watertown, Thomas R. Lawrence, Wayland, and Charles S. Naiman, Boston, Mass., assignors, by mesne assignments, to Sanders Associates, Inc., Nashua, N.H., a corporation of Delaware
Filed Oct. 22, 1965, Ser. No. 501,476
U.S. Cl. 73—355                 9 Claims
Int. Cl. C01k 11/00

ABSTRACT OF THE DISCLOSURE

A thermal detector having an inductance with a toroidal core in which there is a gap discontinuity in which a temperature dependent susceptibility material is positioned. A coil surrounds the core and is coupled to an oscillator, so as to control its frequency. This temperature controlled variable frequency oscillator and a reference frequency oscillator are coupled to a mixer which heterodynes the output signals of the two oscillators. The output of the mixer is coupled to a low pass filter which passes only the beat or differential frequency signal, which may be used to obtain an indication of the sensed temperature.

---

The present invention relates to devices and apparatus for measuring temperature and other heat producing conditions such as radiation. In the prior art a number of devices have been utilized for thermal detection and measurement. Bolometers, for example, utilize changes in resistivity of a material with temperature changes. Thermocouples, and thermopiles detect the thermoelectric electromotive force at a junction between two dissimilar metals. The Golay cells detect pressure changes in a gas when heat is absorbed.

Such prior art devices however, suffer from one or more of the following deficiencies. These deficiencies include lack of sensitivity, low level voltage output, relatively long response time and delicacy of structure.

It is an object of the invention to provide an improved thermal detector capable of measuring relatively small temperature changes.

A still further object of the invention is to provide an improved thermal detector which produces a relatively high voltage output.

Still another object of the invention is to provide an improved thermal detector which responds relatively rapidly to changes in temperature.

Yet another object of the invention is to provide an improved thermal detector which is relatively rugged in construction and reliable in operation.

In accordance with the invention, there is provided a condition responsive apparatus. The apparatus includes a closed lop core having predetermined susceptibility. The core means have a gap discontinuity. Variable susceptibility material means are coupled to the core means in the gap discontinuity.

The susceptibility of the core and material means, in combination vary in response to the variation of a selected condition.

Signal means are coupled to the core-material means for providing an indication in a change in susceptibility of the material in response to a change in the selected condition.

In a preferred form of the invention, the condition responsive apparatus is a thermal detector and the condition is temperature.

In one form of the invention, signal means include an oscillator circuit coupled to the core means for producing a variable frequency signal in response to temperature changes. A reference signal is provided for producing a reference frequency signal. A mixer circuit is coupled to the oscillator circuits for heterodyning the variable and reference signals to produce a difference signal. The difference frequency provides a quantitative indication of temperature change.

In another form of the invention the variable susceptibility material is manganese phosphide.

Other and further objects of the invention will be apparent from the following description taken in connection with the accompanying drawings and its scope will be pointed out in the appended claims.

The underlying principle of the invention is based upon the change in magnetic susceptibility of certain materials which occurs when heat is absorbed. By introducing such a material, such as manganese phosphide, into a discontinuity in the magnetic flux circuit of the frequency defining inductance of an oscillator, changes in susceptibility of the material produce a shift in the natural frequency of the oscillator. Such a frequency shift may be detected by using well known heterodyning techniques to produce a beat frequency. The beat or difference frequency may be directly measured to provide an indication of the change in temperature. The frequency shift $\Delta f$ is defined by equation $$\text{Equation } \Delta \frac{f}{f} = -\frac{2\pi n \Delta x}{1 + 4\pi x}$$

Where $f$ is the frequency of a predetermined temperature condition, $n$ is the ratio of the volume of the material to the volume of the inductance and $x$ is the susceptibility. It turns out that the sensitivity $\Delta f/f$ is better than one part in $10^6$.

Figure 1:
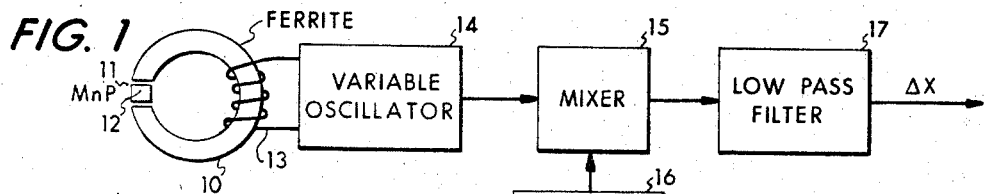
FIG. 1 is a schematic circuit block diagram embodying the thermal detector of the invention.

Referring now to the drawing, and with particular reference to FIG. 1 there is here illustrated a schematic circuit block diagram of a thermal detector embodying the invention. The circuit includes an inductance, an oscillator, a mixer, a reference oscillator, and a low pass filter. The inductance has a toroidal core 10 having a gap discontinuity 11 which is coupled to the varable susceptibility material 12, a coil 13 surrounding the core 10 is coupled to an oscillator 14. A reference oscillator 16 and the oscillator 14 are coupled to the mixer 15. The output of the mixer 15 is coupled to the low pass filter 17. The oscillator 14 may have a natural frequency of 6 megacycles corresponding with a predetermined low temperature. As the susceptibility of the material 12 increases with the increased temperature, the apparent inductance increases causing the frequency of the oscillator to shift downwardly. The reference oscillator 16 maintains its frequency at 6 megacycles. By heterodyning the variable frequency signal from the oscillator 14 with the reference frequency signal from the oscillator 16 at the mixer 15, an output difference frequency signal is produced which is indicative of a temperature change. The low pass filter 17 permits only the difference frequency to appear in the output. The output frequency my be coupled to an oscilloscope where it may be measured.

The change in frequency may be counted directly by counting the variable frequency signal or by counting the beat or difference frequency signal.

Figure 2:
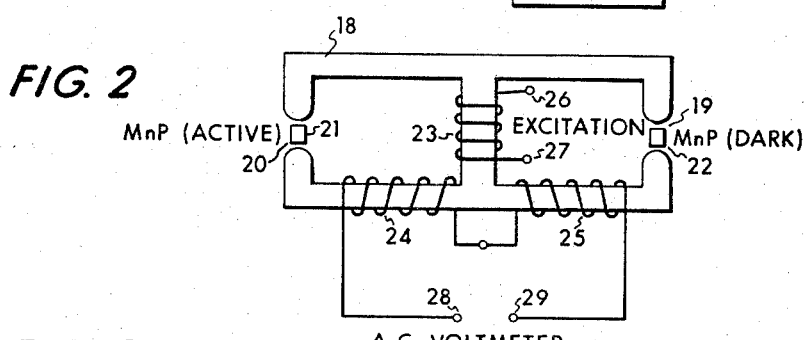
FIG. 2 is a schematic diagram of a magnet coil useful in the invention.

Referring now to FIG. 2 there is here illustrated a magnetic core means having a plurality of closed loops, each of the loops having a gap discontinuity. Here a pair of C cores have been coupled together back to back. Thus a core 18 is shown having a gap discontinuity 19 and a gap discontinuity 20 in each of its otherwise closed loop legs. Variable susceptibility materials 21 and 22 are coupled in the gaps as shown. An input winding 23 surrounds the central leg of the core. A pair of output windings are connected in series-bucking and are coupled to the output arms of the core 18. The material 22 is maintained in a constant temperature environment. In the case of radiation, the material 22 is maintained free of radiation. An input signal is applied at the terminals 26 and 27. The output signal coupled through the windings 24 and 25 is zero for the dark or no radiation condition. The output signal is also zero for the constant temperature condition. When the temperature of the material 21 exceeds that of the material 22 the apparent inductance of the output coil 24 increases. The voltage across the coil 24 is greater than that of the coil 25. The difference between the coil 24 and 25 appears at the terminals 28 and 29.

Figure 3:
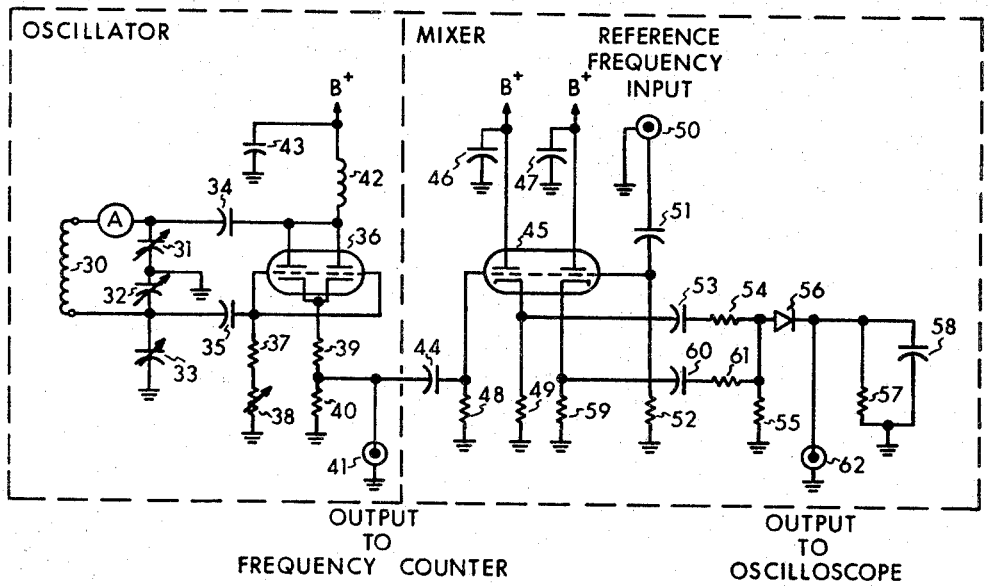
FIG. 3 is a detailed schematic circuit diagram of an oscillator and mixer circuit useful in the invention.

Referring now to FIG. 3 there is here illustrated a schematic diagram of an oscillator and mixer circuit useful in the invention. A coil 30 which corresponds to the core means 10, gap 11, material 12, and coil 13 of FIG. 1 is shown connected in a Colpitts oscillator circuit having a pair of variable capacitors 31 and 32 coupled in parallel with the coil 30. A balancing variable capacitor 33 is coupled from one end of the capacitor 32 to ground. The junction between capacitors 31 and 32 is grounded. The coil 30 is coupled through a pair of capacitors 34 and 35 to a plate and grid of a dual triode tube 36. The grid is also coupled through a resistor 37, and a variable resistor 38 to ground. The cathode is coupled through a resistor 39 and resistor 40 to ground. The junction between the resistors 39 and 40 is coupled to an output terminal 41 which is used for a frequency counter. The capacitor 34 is coupled to the plates of the tube 36 and then through an rf choke 42 to a source of positive voltage labeled B+. The voltage source is by-passed by a capacitor 43 to ground. The plates of the tube 45 are coupled to B+ and by-passed to ground through capacitors 46 and 47, respectively. The grid is coupled through a resistor 48 to ground and the left hand cathode is coupled through a resistor 49 to ground. An input terminal 50 for receiving a reference frequency signal is coupled through a capacitor 51 to the grid and through a resistor 52 to ground. The resistor 49 is coupled through a capacitor 53 and resistor 54, to a resistor 55 to ground and through a diode 56 through a resistor 57 to ground, the resistor 57 is by-passed by a capacitor 58. The right hand cathode is coupled to the resistor 59 and through a capacitor 60 and a resistor 61 to the resistor 55. The diode 56 is coupled through the output terminal 62 for coupling the difference signal to an oscilloscope.

Other materials which exhibit veriable magnetic susceptibility may be used. The materials include chromium doped manganese antimonide $Cr_{0.1}$, $Mn_{1.90}$ Sb, iron rhodium alloy and chronium sulfide $CrS_{1.17}$. The change in frequency which may be observed is of the order of ten percent (10%) per degree Kelvin. The total frequency variation may take place over a temperature range of as little as one degree Kelvin (1° K.) or less. Thus the sensitivity to temperature changes as little as one thousandth at a degree (0.001° K.) may readily be measured.

It will be apparent from the foregoing description of the invention that is has great application in the field of thermal and radiation measurements.

While there has hereinbefore been described what at present are considered to be the preferred embodiments of the invention, it will be apparent to those of ordinary skill in the art that any modifications and changes may be made thereto without departing from the true spirit and scope of the invention.

It will be considered, therefore, that all those changes and modifications which fall fairly within the scope of the invention shall be a part of the invention.

What is claimed is:
1. A thermal detection apparatus, comprising:
    closed looped magnetic core means having a predetermined susceptibility, said core means having a gap discontinuity;
    variable susceptibility magnetic material means coupled to said core means in said gap discontinuity, the susceptibility of said material varying in response to temperature, the susceptibility of said core and material means, in combination, varying in response to variation of temperature; and
    signal means coupled to said core material means for providing an indication of a change in susceptibility of said material in response to a change in temperature, said signal means including an oscillator circuit coupled to said core means for producing a variable frequency signal in response to a temperature change, a reference oscillator for producing a reference frequency signal and a mixer circuit coupled to said oscillator circuits for heterodyning said variable and reference frequency signals to produce a difference frequency signal, said difference frequency providing a quantative indication of said temperature change.
2. The detector of claim 1, wherein:
said variable susceptibility material is manganese phosphide.
3. The detector of claim 2, wherein:
said core means is toroidal and formed of ferrite.
4. The detector of claim 1, wherein:
said core means is toroidal and formed of ferrite.
5. The detector of claim 1, wherein:
said temperature change is due to radiation applied to said variable susceptibility material.
6. The detector of claim 1, wherein:
said core means are formed in a plurality of closed loops, each said loop having a gap discontinuity.
7. The detector of claim 1, wherein:
said variable susceptibility material is manganese antimonide.
8. The detector of claim 1, wherein:
said variable susceptibility material is an iron rhodium alloy.
9. The detector of claim 1, wherein:
said variable susceptibility material is chromium sulphide.

References Cited

UNITED STATES PATENTS

| | | | |
|---|---|---|---|
| 1,742,138 | 12/1929 | Faus | 73—362 XR |
| 2,222,425 | 11/1940 | Wehe | 73—355 X |
| 2,350,329 | 6/1944 | Hornfeck | 73—362 |
| 2,645,126 | 7/1953 | Hornfeck | 73—355 |
| 3,183,705 | 5/1965 | Welkowitz | 73—362 |

OTHER REFERENCES

Kip, A. F.: Fundamentals of Electricity and Magnetism, p. 285, McGraw-Hill, 1962.

LOUIS R. PRINCE, *Primary Examiner.*

FREDERICK SHOON, *Assistant Examiner.*

U.S. Cl. X.R.

73—362; 331—66